Nov. 30, 1926.
O. B. MARTIN
TOOL
Filed Jan. 26, 1925
1,608,800
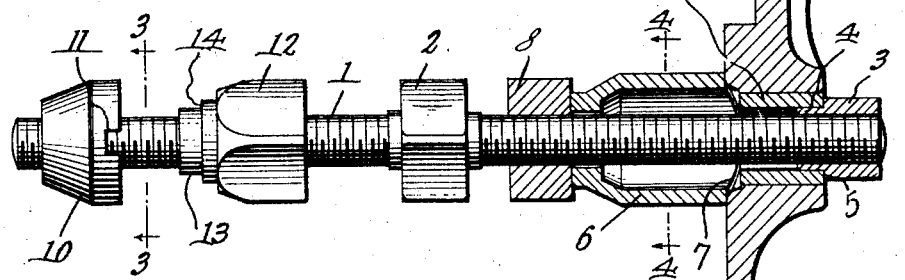
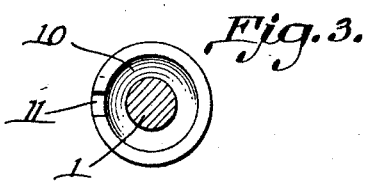
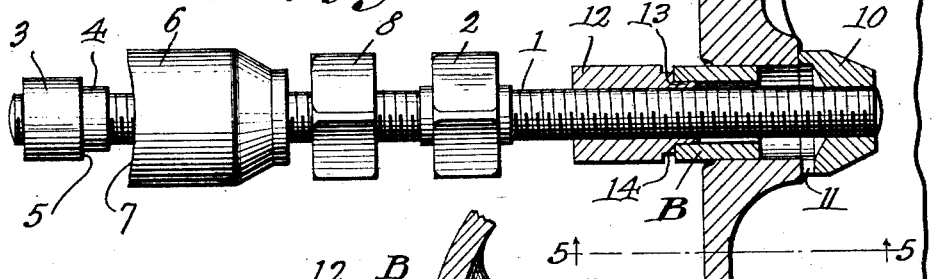
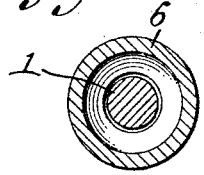
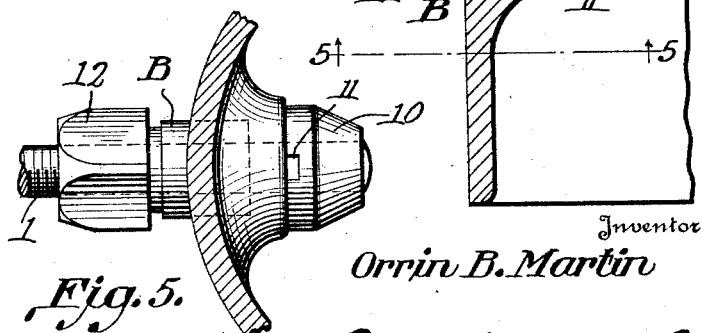
Inventor
Orrin B. Martin
By C. A. Snow & Co
Attorneys Patented Nov. 30, 1926.

1,608,800

UNITED STATES PATENT OFFICE.

ORRIN B. MARTIN, OF WINNSBORO, TEXAS.

TOOL.

Application filed January 26, 1925. Serial No. 4,872.

This invention relates to a tool for removing and replacing piston pin bushings.

The object of the invention is to construct a tool of this character which may be used for either inserting or removing bushings for piston pins and which is simple and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of a tool constructed in accordance with this invention and shown applied ready for use to remove an old bushing, the piston and the bushing being in section;

Fig. 2 is a similar view showing the pin in use for inserting a new bushing;

Fig. 3 is a transverse section taken on the line 3—3 of Fig. 1;

Fig. 4 is a similar view taken on the line 4—4 of Fig. 1; and

Fig. 5 is a detail sectional view.

In the embodiment illustrated in Figs. 1 to 4 a threaded rod 1 is shown having a nut 2 fixed thereto midway its ends.

One end of the tool is designed for use in pulling out the bushing from a piston P while the other is designed for putting in or inserting bushings in the piston P.

Mounted on one end of the rod 1 is a bushing engaging sleeve 3 having a reduced portion 4 at its inner end which is designed to fit within the bushing B to be removed, the shoulder 5 at the base of said reduced extension 4 operating to engage the inner edge of the bushing to force it out when pressure is brought to bear on sleeve 3 by means to be described.

A sleeve or collar 6 is loosely mounted on the rod 1 and has one end shaped to conform to the shape of the seat or opening around the bushing B in the piston P as is shown at 7 in Fig. 1. A nut 8 is threaded on the rod 1 to cooperate with the sleeve 6 and sleeve 3 for forcing out the bushing B. To do this the sleeve 3 is removed from the rod by unscrewing it and the rod then is inserted through the bushing and extended into the piston P. The sleeve 3 is then screwed on this end of the rod with the extension 4 inserted in the bushing as shown in Fig. 1. When the tool has been so arranged the sleeve 6 is placed against the outer face of the piston around the bushing and the nut 8 is screwed out causing the rod with the sleeve 3 to move outwardly against the bushing B and force said bushing out of its seat.

When it is desired to insert a new bushing in the piston P the rod is reversed and the nut 10 at the end thereof is removed and the bushing B to be inserted is slipped on the rod over the reduced extension 13 of a sleeve 12 carried by the rod. The shoulder 14 at the base of the extension 13 abuts against the outer edge of the bushing B and when the nut 12 is moved outward it will force the bushing B into the opening in the piston P.

By making this tool double or two-in-one either end may be used as needed without necessitating removal of all the nuts and possibly the loss of some of them.

The nut 10 which is used for inserting a bushing is notched as shown at 11 so that when the bushing has reached a predetermined point in the position of a bushing it may be seen, by looking into the piston thus determining the proper position of the bushing in its seat.

While this tool is shown with the holding nut arranged midway the length thereof and the nuts and sleeves used for putting in or removing the bushing arranged on opposite sides thereof obviously this holding nut may be located at either end of the rod and the various nuts mounted on the rod, it being used for either purpose by removing the nuts not needed for the purpose intended and using only those required for the work in hand.

This simple two-in-one tool may be cheaply constructed and easily used for removing bushings by inexperienced as well as by experienced workmen, it being especially designed for use for removing and inserting bushings for piston pins of automoblie engines.

I claim:—

In a tool of the class described, a threaded rod, means for rotating the rod, a sleeve on the rod and adapted to engage a wrist pin bushing, a nut on the rod and adapted to engage the piston adjacent to its wrist pin opening, said nut having a notch formed therein to permit a wrist pin bushing to be viewed therethrough, and said rod adapted to operate to move a wrist pin bushing within its opening In testimony that I claim the forgoing as my own, I have hereto affixed my signature.

ORRIN B. MARTIN.